United States Patent [19]

Laufer

[11] Patent Number: 5,325,837
[45] Date of Patent: Jul. 5, 1994

[54] FUEL INJECTION APPARATUS FOR INTERNAL COMBUSTION ENGINES

[75] Inventor: Helmut Laufer, Gerlingen, Fed. Rep. of Germany

[73] Assignee: Robert Bosch GmbH, Stuttgart, Fed. Rep. of Germany

[21] Appl. No.: 130,495

[22] Filed: Oct. 1, 1993

[30] Foreign Application Priority Data

Nov. 19, 1992 [DE] Fed. Rep. of Germany ....... 4238980
Jun. 25, 1993 [DE] Fed. Rep. of Germany ....... 4321156

[51] Int. Cl.$^5$ ............................................. F02M 37/04
[52] U.S. Cl. .................................... 123/506; 123/449
[58] Field of Search ............... 123/449, 494, 503, 506, 123/458, 299, 300, 357, 358, 359

[56] References Cited

U.S. PATENT DOCUMENTS

| | | | |
|---|---|---|---|
| 2,856,482 | 8/1982 | Linder | 123/494 |
| 4,359,032 | 11/1982 | Ohie | 123/458 |
| 4,438,496 | 3/1984 | Ohie | 123/458 |
| 4,576,129 | 3/1986 | Wallenfang | 123/357 |
| 4,594,979 | 6/1986 | Yasuhara | 123/357 |
| 4,788,960 | 12/1988 | Oshizawa | 123/506 |
| 4,884,549 | 12/1989 | Kelly | 123/506 |
| 5,070,836 | 12/1991 | Wahl | 123/506 |
| 5,080,076 | 1/1992 | Eckert | 123/494 |
| 5,205,262 | 4/1993 | Anton | 123/506 |
| 5,273,017 | 12/1993 | Braun | 123/506 |

FOREIGN PATENT DOCUMENTS

0241697 3/1991 European Pat. Off. ..... F02M 59/36
3601710 7/1987 Fed. Rep. of Germany ......... F02M 51/04

*Primary Examiner*—Carl S. Miller
*Attorney, Agent, or Firm*—Edwin E. Greigg; Ronald E. Greigg

[57] ABSTRACT

A fuel injection apparatus for internal combustion engines comprising a pump work chamber defined in a bore of a housing by a pump piston. The pump work chamber is supplied with fuel and relieved via a fuel line containing a magnet control valve. Moreover, the pump work chamber communicates with an injection valve via a supply line. Controlling of the injection is done via the opening or closing of the magnet control valve during the pumping stroke of the pump piston; to that end, the magnet valve is triggered by a control unit. To enable performing an accurate injection, a needle stroke transducer is disposed on the nozzle needle of the injection valve; if a limit value is exceeded, its stroke motion is detected as a precise signal for the onset and end and hence the size of the injection quantity and is transmitted to the control unit, where this actual value is compared with a set-point value from a performance graph, and a correction of the magnet valve triggering is consequently done performed, if needed.

13 Claims, 1 Drawing Sheet

FUEL INJECTION APPARATUS FOR INTERNAL COMBUSTION ENGINES

BACKGROUND OF THE INVENTION

The invention is based on a fuel injection apparatus for internal combustion engines as defined hereinafter. In one such fuel injection apparatus, known from German Offenlegungsschrift 36 01 710, a valve triggered by an electromagnet is used to control the onset of injection and the injection quantity; this valve is inserted into a fuel line from the pump work chamber into a low-pressure chamber. By way of the closing and opening of this valve during the pumping stroke of the pump piston, the instant and duration of high-pressure pumping in the pump work chamber and hence of the injection at the injection valve connected to it via an injection line are determined. In order to avert major noise production and pollutant emissions in internal combustion engines that operate with high injection pressure, and above all when injection is done directly into the combustion chamber of the engine to be supplied, where the noise and pollutants are due to the ignition delay at the onset of combustion, the injection quantity is split into a preinjection quantity and a main injection quantity. In this way, at the onset of combustion or in other words when the fuel-air mixture ignites, a slight quantity of fuel is initially injected and prepared by the compressed air in the combustion chamber, and it then burns with a lesser pressure gradient. To that end, in the known fuel injection apparatus the magnet valve closes and then opens immediately again to terminate the preinjection. The magnet valve needle opens only briefly and not completely, and then closes again for the main injection. In order to detect exactly the onset and end of injection, the known fuel injection apparatus has sensors on its injection valve that detect the needle stroke of the injection valve and transmit it to a control unit.

In the known fuel injection apparatus the problem arises that the size of the preinjection quantity, the interval between the preinjection quantity and the main injection quantity, and the main injection quantity cannot be controlled with sufficient precision, since even when the trigger times of the magnet valve are the same, different nozzle opening times and injection quantities result from component drift, temperature changes and fuel tolerances.

OBJECT AND SUMMARY OF THE INVENTION

The fuel injection pump according to the invention has an advantage over the prior art that the sensor at the injection valve transmits an opening or closing motion of the nozzle needle to the electric control unit only once this process has actually begun; that is, once fuel is injected into the combustion chamber of the engine to be supplied and the injection valve closes; a delayed fuel motion can now be taken into account by means of the limit value. Moreover, this limit value results in a certain smoothing of the measurement findings of the sensor, so that measurement inaccuracies and errors, for instance from an unintended reopening of the nozzle needle from recoiling upon a rapid closure, can be corrected by the control unit. Advantageously, both the onset of the effective opening stroke and the onset of the effective closing stroke of the nozzle needle can be detected reliably, thus providing a reliable correlation with the injected fuel quantity over the opening duration of the injection valve, which elapses between the onset and end of the nozzle needle opening time, and to take the injected fuel quantity into account in the accurate metering of the injection quantity. It is advantageous that not only the nozzle needle opening stroke but also parameters of the engine while in operation, such as rpm, load, and temperature, can be detected, so that optimal injection control can be performed.

The invention will be better understood and further objects and advantages thereof will become more apparent from the ensuing detailed description of a preferred embodiment taken in conjunction with the drawings.

BRIEF DESCRIPTION OF THE DRAWINGS

In FIG. 2, the magnet valve triggering is plotted over the time or degrees of camshaft angle;

In FIG. 3, the stroke of the magnet valve member is plotted over time; and

In FIG. 4, the nozzle needle stroke of the injection valve is plotted over time.

DESCRIPTION OF THE PREFERRED EMBODIMENT

Figure 1:
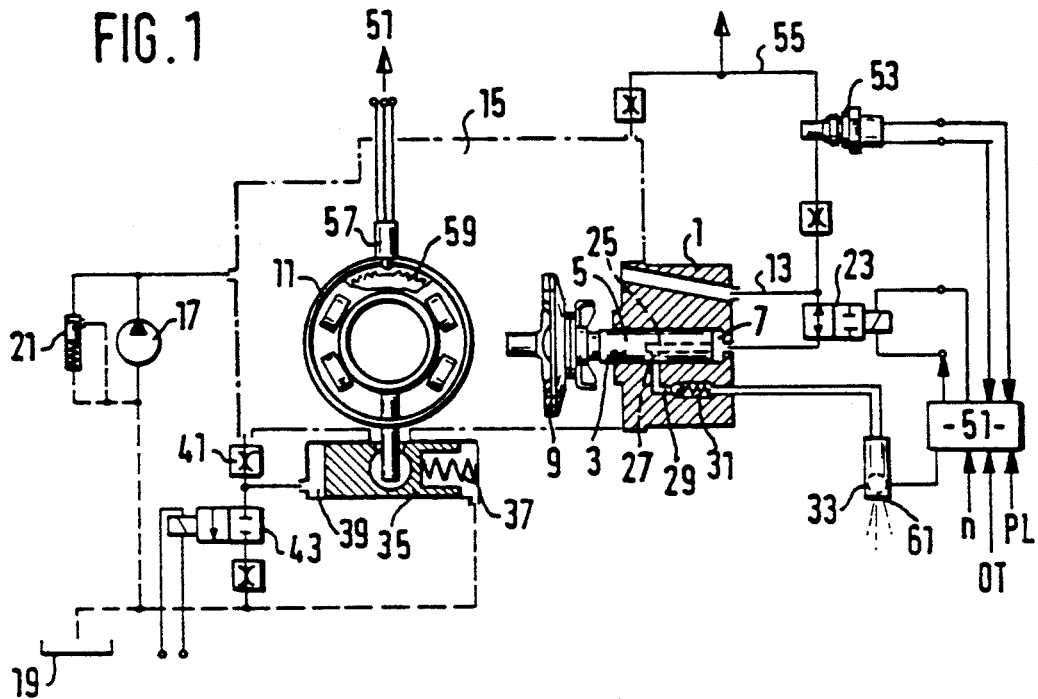
FIG. 1 is a schematic illustration of the fuel injection apparatus according to the invention.

In the fuel injection apparatus schematically shown in FIG. 1, a bore 3, in which a pump piston 5 encloses a pump work chamber 7, is provided in a pump housing 1 that forms a cylinder liner. Via a cam plate 9, which travels on a roller race 11 shown rotated by 90°, the pump piston 5 is driven synchronously to the engine rpm by means not shown, and in its rotary motion it executes a reciprocating pumping motion with an intake stroke and a pumping stroke. The delivery of fuel to the pump work chamber 7 takes place via a fuel conduit 13, which begins at a pump work chamber 15 of lower fuel pressure. This suction chamber 15 is supplied with fuel by means of a fuel feed pump 17 from a fuel supply tank 19; the pressure in the pump section chamber 15 is adjusted with the aid of a pressure control valve 21 that is connected parallel to the fuel feed pump 17.

An electrically actuatable valve 23, which by way of example may be a magnet valve, is inserted into the fuel conduit 13 as a fuel quantity metering device; it opens and closes the communication between the pump work chamber 7 and the pump suction chamber 15 and thus controls the quantity of fuel delivered to the pump work chamber 7 during the intake stroke of the pump piston 5 and controls the high-pressure pumping quantity during the pumping stroke. Also leading away from the pump work chamber 7 is a blind bore 25, which is disposed in the pump piston 5 and from which a radial bore 27 leads outward. The radial bore 27 discharges into a distributor groove, not shown in detail, which extends along the pump piston axis and by which supply lines 27 (one for each cylinder) are made to communicate in succession with the pump work chamber 7 upon the rotation of the pump piston 5 during the pumping stroke. These supply lines are distributed along the circumference of the bore 3 to match the number of cylinders of the engine to be supplied; each contains one relief valve 31 embodied as a check valve, and each communicates with one injection valve 33. The control of the high-pressure pumping in the pump work chamber 7 during the pumping stroke of the pump piston 5 is done in a known manner via the magnet valve 23; by its closure, the high fuel pressure for injection is built up in the work chamber 7, which as the piston stroke continues opens the relief valve 31 and, when the injection pressure is reached, lifts a known nozzle needle, not shown in detail here, in the injection valve from its seat, so that the fuel at the injection valve 33 attains injection. In the exemplary embodiment, the injection is terminated by the reopening of the magnet valve 23, and the fuel, which is at high pressure, flows out of the pump work chamber 7 into the pump suction chamber 15 via the fuel conduit 13. Because of the rapid pressure drop in the pump work chamber 7, the injection valve 33 closes as well, and in order to obtain a certain standby pressure in the supply line 29, the relief valve 31 closes as well, which moreover in its closing motion increases the volume enclosed between it and the injection valve 33 and by this pressure relief reinforces the closing process at the injection valve 33, or in other words reinforces the seating of the nozzle needle on its seat.

For varying the injection onset, an injection adjusting piston 35 is also provided, which is coupled to the roller race 11 and is adjustable counter to the force of a spring 37. The injection adjusting piston 35 defines a pressure chamber 39, which communicates via a throttle 41 with the pump suction chamber 15 and is thus acted upon by the rpm-dependent pressure in the pump suction chamber 15. In accordance with this rpm-dependent pressure, the instant of injection is shifted to early as the rpm increases, by rotation of the roller race 11 with the aid of the injection adjusting piston 35. In order to vary the injection adjusting time, the pressure chamber 39 also communicates with the suction side of the feed pump 17 via a second magnet valve 43 and can be relieved with the aid of this magnet valve 43. Injection onset control may also be undertaken solely by controlling the magnet valve 23, however; then this valve, by its closing state, determines the times of high-pressure fuel pumping and by its closing and opening process it determines the injection onset and the injection end, respectively. For exact control of the high-pressure injection, which for technical combustion reasons can be divided into a preinjection quantity and a main injection quantity by means of a reopening and closing of the magnet valve 23 during the high-pressure pumping phase, it is necessary to trigger the magnet valve 23 as a function of current operating parameters of the engine and injection pump. To that end, the magnet valve 23 is triggered by a control unit 51, which is connected to various sensors. The control unit 51 is for instance supplied with the fuel temperature, via a temperature sensor 53 in a diversion line 55; with the current location of the cam stroke and the injection adjustment location, via an angle encoder 57, which cooperates with an angle gear 59 on the roller race 11; and with the actual opening and closing instant of the injection valve 33, via a commercially available needle stroke transducer 61. Moreover, the current engine rpm (n), top dead center (OT) of the various cylinders, and the instantaneous gas pedal position (load, PL), are also supplied to the control unit 51 via sensors on the engine. The data received are compared in the control unit 51 with a previously input performance graph, with which a certain opening and closing instant of the injection valve 33, and hence a precisely predefined injection duration are associated with every opening point of the engine. Triggering of the magnet valve 23 by the control unit 51 now takes place as a function of the values predetermined for the existing operating point; direct control of the desired injection durations is possible via the recording of the needle stroke of the injection valve 33, and these durations can be corrected immediately if they deviate from the value required.

The injection nozzle opening durations are stored in degrees of camshaft angle in the control unit (51), which as a function of the rpm are assigned to certain injection quantities and are selected in accordance with the engine operating parameters; the camshaft angles are detected and monitored with a built-in incremental angle-time sensor.

Figure 2:
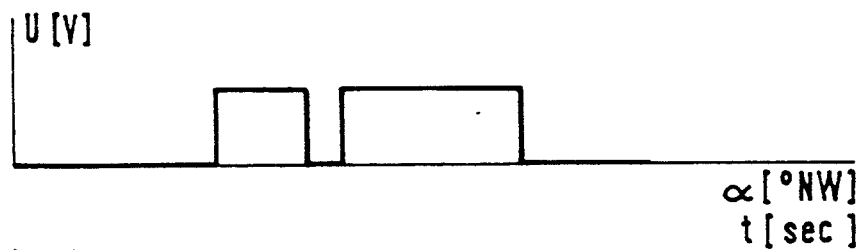
FIGS. 2-4 show diagrams as follows.
Figure 3:
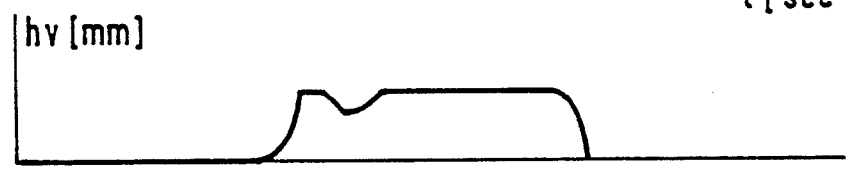
Figure 4:
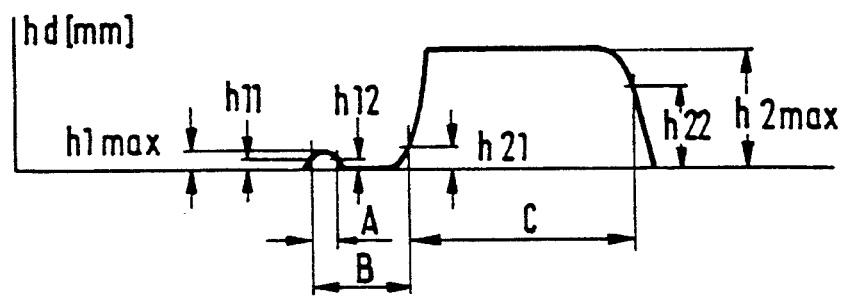

In the diagrams shown in FIGS. 2-4, the control of the injection course at the injection valve is shown in further detail. FIG. 2 shows the electrical triggering (U/Volts) of the magnet valve 23 as a function of the time (t/sec.) or the rotary motion of the pump piston ($\alpha/°$ of camshaft angle). Analogously, in FIG. 2 the course of the stroke of the valve member (hv) of the magnet valve 23, which is parallel to the triggering in FIG. 2, is plotted, and in FIG. 4, again parallel to the foregoing, the course of the nozzle needle stroke (hd), or in other words of the actual injection event, is plotted. At the beginning of the preinjection, the magnet valve 23 is first triggered. After a certain delay, the valve member of the magnet valve 23 closes and as a result opens the injection valve 33 by lifting the nozzle needle with a certain delay, and the preinjection quantity attains injection. As the course continues, the magnet valve 23 is briefly switched to be without current, but the valve member does not open completely because of inertia; the throttled cross section at the magnet valve 23 is nevertheless large enough that across it the high fuel pressure in the pump work chamber 7 slackens enough that the pressure drops below the requisite injection pressure, and the injection valve 33 terminates the preinjection and closes. The next time the magnet valve 23 is triggered, it closes again completely, and the injection is continued with the onset of injection of the main quantity at the injection valve, until at the end of the main injection, opening of the magnet valve 23 occurs, with a consequent closure of the injection valve, i.e., seating of the nozzle needle, that is delayed somewhat because of inertia. In order to gain reliable information about the accurate size of the preinjection and main injection quantity for the sake of a comparison of the actual and set-point values of the nozzle needle stroke in the control unit 51, the applicable signal, as shown in FIG. 4, is not tripped until a certain limit value of the nozzle needle stroke is exceeded. Thus for the recorded duration of the preinjection (A), the time from when the first threshold value h11, which identifies the injection onset, is exceeded until a second threshold value h12, which identifies the end of the preinjection, is exceeded is obtained; the spacing between the onset of the preinjection quantity and the main injection quantity (B) is obtained from when the threshold value h11 is exceeded until when a threshold value h21 that records the onset of the main injection is exceeded; and the main injection quantity is found from the time that elapses between when the threshold value h21 is exceeded and the threshold value h22 that identifies the end of injection. It should be noted that the threshold values that identify the onset of the injections are exceeded from below, and those for the termination of injections are exceeded from above, or in other words from a maximum value onward; so that the signals transmitted to the control unit 51 by the needle stroke transducer can be accurately associated with the control unit 51.

The threshold values are defined as relative thresholds at h1max upon the preinjection and h2max upon the main injection. The magnitudes of the thresholds are at approximately 50% for h1max and from 5 to 20% for h2max.

Besides the instance of injection, the injection variables that in the final analysis must be detected and controlled are these:

size of the preinjection quantity, which is identified by the duration A of the nozzle needle opening time during the preinjection;

spacing between the preinjection and the main injection, which is identified by the duration B; and the size of the main injection quantity, which is identified by the duration C of the nozzle needle opening time during the main injection.

With the fuel injection apparatus according to the invention, it is thus possible to control the injection event optimally and to monitor the actual injection quantity via the actual injection duration at the injection valve, compare it with a set-point value, and correct it, so that the sizes of the preinjection and main injection quantities and their spacing always correspond to the set-point values. The control option described is limited not only to all injection pumps of the distributor pump type, but can also be employed with magnet-controlled unit fuel injectors and plug-in pumps.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fuel injection apparatus for internal combustion engines, having at least one pump work chamber (7), defined by a pump piston (5) in a bore (3) of a cylinder liner (1), said work chamber is made to communicate with an injection valve (33) via a line (29) which is supplied with fuel from a low-pressure fuel chamber (15) and is relieved via a fuel line (13) having a control valve (23) electrically actuated by a control unit (51), wherein a fuel quantity injected at the injection valve (33) and the instant of injection are controllable by the electrically actuated control valve (23) during a pumping stroke of the pump piston (5) in such a manner that the injection quantity is split into a successive preinjection quantity and a main injection quantity, a sensor (61) is disposed on the injection valve (33), said sensor detects the injection onset and injection end of said injection valve (33) and directs a signal to the control unit (51) that triggers the electric valve (23) said control unit compares this signal, representing an actual value, with a set-point value derived from a performance graph and if the actual value deviates therefrom readjusts the triggering for the opening and closing motion of the electrically actuated valve (23), the sensor (61), is embodied as a needle stroke transducer, and does not transmit the signal for the opening or closing motion of the nozzle needle to the control unit (51) until a certain limit value beginning at the onset of motion of the nozzle needle in the opening and closing direction is exceeded or fails to be attained.

2. A fuel injection apparatus as defined by claim 1, in which the injection duration at the injection valve, ascertained from the time between the signal for the opening stroke motion and the signal for the closing stroke motion of the nozzle needle of the injection valve (33), is used in the control unit (51) as a measuring variable to be processed for the injected fuel quantity.

3. A fuel injection apparatus as defined by claim 1, in which the limit value, with adaptation given operating conditions amounts in the preinjection to approximately 50% of h1max and in the main injection to approximately 5 to 20% of h2max of the nozzle needle motion in the opening or closing direction.

4. A fuel injection apparatus as defined by claim 2, in which the limit value, with adaptation given operating conditions amounts in the preinjection to approximately 50% of h1max and in the main injection to approximately 5 to 20% of h2max of the nozzle needle motion in the opening or closing direction.

5. A fuel injection apparatus as defined by claim 3, in which different limit values are provided respectively for the preinjection and the main injection, and that both the onset of the opening stroke of the nozzle needle and the onset of the closing stroke are detected.

6. A fuel injection apparatus as defined by claim 4, in which different limit values are provided respectively for the preinjection and the main injection, and that both the onset of the opening stroke of the nozzle needle and the onset of the closing stroke are detected.

7. A fuel injection apparatus as defined by claim 1, in which the electrically actuated valve (23) is embodied as a magnet valve.

8. A fuel injection apparatus as defined by claim 1, in which the control unit (51), injection nozzle opening durations are stored in memory in degrees of camshaft angle, which as a function of the rpm correspond to certain injection quantities and are selected in accordance with the operating parameters.

9. A fuel injection apparatus as defined by claim 2, in which the control unit (51), injection nozzle opening durations are stored in memory in degrees of camshaft angle, which as a function of the rpm correspond to certain injection quantities and are selected in accordance with the operating parameters.

10. A fuel injection apparatus as defined by claim 8, in which a temperature sensor (53) is integrated into the fuel system, and its measurement values are likewise processed in the control unit (51) and are taken unto account in the triggering of the magnet valve (23).

11. A fuel injection apparatus as defined by claim 9, in which a temperature sensor (53) is integrated into the fuel system, and its measurement values are likewise processed in the control unit (51) and are taken unto account in the triggering of the magnet valve (23).

12. A fuel injection apparatus as defined by claim 1, in which the fuel injection pump is embodied as a distributor pump, with a pump piston (5) that rotates and simultaneously reciprocates.

13. A fuel injection apparatus as defined by claim 1, in which the fuel injection pump is embodied as a distributor pump with the radially disposed pump piston and a rotating distributor.

* * * * *